(12) United States Patent
Tsujii et al.

(10) Patent No.: US 7,497,294 B2
(45) Date of Patent: Mar. 3, 2009

(54) VEHICLE HAVING FRONT AND REAR FRAMES

(75) Inventors: Eiichirou Tsujii, Shizuoka (JP); Hitoshi Watanabe, Shizuoka (JP); Hiroshi Kitagawa, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 421 days.

(21) Appl. No.: 11/319,032

(22) Filed: Dec. 27, 2005

(65) Prior Publication Data

US 2006/0151225 A1    Jul. 13, 2006

(30) Foreign Application Priority Data

Dec. 27, 2004  (JP)  ............... 2004-375483

(51) Int. Cl.
*B62D 61/02*  (2006.01)
*B60K 28/14*  (2006.01)

(52) U.S. Cl. .................. 180/219; 180/283; 180/222

(58) Field of Classification Search ........ 180/219, 180/283, 222
See application file for complete search history.

(56) References Cited

U.S. PATENT DOCUMENTS

| 4,709,934 | A | * | 12/1987 | Suzuki et al. | 280/6.157 |
|---|---|---|---|---|---|
| 4,815,758 | A | * | 3/1989 | Yoshida | 280/6.159 |
| 5,086,866 | A | * | 2/1992 | Banjo et al. | 180/219 |
| 5,188,192 | A | * | 2/1993 | Sbarro | 180/219 |
| 5,211,420 | A | * | 5/1993 | Iwashita | 280/5.503 |
| 5,485,893 | A | * | 1/1996 | Summers | 180/219 |
| 5,711,390 | A | * | 1/1998 | Hikichi et al. | 180/219 |
| 6,668,960 | B1 | * | 12/2003 | Parker | 180/227 |
| 6,905,126 | B1 | * | 6/2005 | Jurrens | 280/5.514 |
| 7,131,650 | B2 | * | 11/2006 | Melcher | 280/5.52 |
| 7,270,211 | B1 | * | 9/2007 | Jones | 180/219 |
| 7,287,761 | B2 | * | 10/2007 | Montgomery | 280/5.514 |
| 7,303,039 | B2 | * | 12/2007 | Inaba et al. | 180/227 |

FOREIGN PATENT DOCUMENTS

JP    63-222987    9/1988

* cited by examiner

*Primary Examiner*—Paul N Dickson
*Assistant Examiner*—Marlon A Arce
(74) *Attorney, Agent, or Firm*—Hogan & Hartson LLP

(57) ABSTRACT

The present invention provides a vehicle, such as a motorcycle, that can sufficiently control a stagger in an extremely slow speed running state and a tumble of vehicle body in the standstill state thereof. This vehicle, such as a motorcycle includes a head pipe that supports a front wheel and a main frame that supports a rear wheel. The head pipe is movably attached to the main frame. The vehicle includes a hydraulic cylinder for shifting the centroid of the vehicle body by moving one of the head pipe and the main frame 3 relative to the other.

12 Claims, 15 Drawing Sheets

VEHICLE HAVING FRONT AND REAR FRAMES

BACKGROUND OF THE INVENTION

1. Field of the Invention

The present invention relates to a vehicle and, in particular, to a vehicle having a front frame supporting a front wheel and a rear frame supporting a rear wheel.

2. Description of Related Art

Some conventional vehicles, such as motorcycles, include a front frame supporting a front wheel and a rear frame supporting a rear wheel. The front and rear wheels of one type of conventional motorcycle include a round tire having an arcuate-shaped portion that contacts the ground. This type of conventional motorcycle has a drawback such that the vehicle body can incline sideways and stagger when it runs at an extremely slow speed, or the vehicle body also can incline sideways unless using any tumble preventing means such as, for example, a stand or an auxiliary wheel when the vehicle body is standstill.

Another type of conventional motorcycle, as disclosed in Japanese Patent Document JP-A-Sho63-222987, includes a front wheel with a round tire and a rear wheel having a "flat tire" with a U-shaped cross-section, wherein the portion that contacts the ground is flatly shaped. This motorcycle includes a structure in which a swingable shaft positioned between a swing vehicle body supports the front wheel and a non-bank vehicle body supports the rear wheel. The front portion of the vehicle body (swing vehicle body) is swingable under a condition that the rear portion of the vehicle body (non-bank vehicle body), that includes an engine, extends upright. That is, the front wheel can incline relative to a vertical direction, while the rear wheel stands upright relative to the ground regardless of vehicle speed. In this motorcycle, the stagger or tumble of the vehicle body can be controlled to a certain extent, if a rider operates the front wheel to not incline relative to the vertical direction in an extremely slow speed running state or in a standstill state.

However, in this conventional motorcycle disclosed in JP-A-Sho63-222987, when a rider adds weight to the motorcycle by sitting on the front portion (swing vehicle body) that is swingable relative to the rear wheel, the centroid is considered to shift to the inclination direction of the front portion (swing vehicle body) if the front wheel inclines relative to the vertical direction when the motorcycle runs at the extremely slow speed. Accordingly, there exists a problem that sufficient control of the stagger of the vehicle body is difficult. Also, when the front wheel starts inclining relative to the vertical plane while the motorcycle is standstill without any rider, it is difficult to control the inclination of the front wheel. Thus, there arises another problem that the vehicle body tumbles over unless a tumble preventing means is used, such as a stand, an auxiliary wheel, or the like.

SUMMARY OF THE INVENTION

The present invention resolves the problems discussed above. Therefore, an object of the present invention is to provide a vehicle that can sufficiently control a stagger in an extremely slow speed running state and a tumble of vehicle body in the standstill state or position thereof.

To achieve this object, a vehicle according to one aspect of the present invention includes a front frame supporting a front wheel and a rear frame supporting a rear wheel, wherein the front frame is movably attached to the rear frame. In addition, the vehicle includes a centroid shifting means for shifting a centroid of a vehicle body by moving one of the front frame and the rear frame relative to the other.

The centroid shifting means shifts the centroid of the vehicle body by moving either one of the front frame supporting the front wheel or the rear frame supporting the rear wheel relative to the other. When the vehicle runs at an extremely slow speed, even though the centroid of the vehicle body shifts sideways (width direction of the vehicle body) regardless of the intension of a rider to incline the vehicle body relative to a vertical direction, the centroid sifting means actively shifts the centroid to an opposite side relative to the inclination direction of the vehicle body. The inclining vehicle body can extend upright along the vertical direction. The stagger of the vehicle body can be controlled in the extremely slow speed running state. By providing the centroid shifting means for shifting the centroid of the vehicle body by moving either one of the front frame or the rear frame relative to the other, when the vehicle is standstill, even though the centroid of the vehicle body shifts sideways (the width direction of the vehicle body) to incline the vehicle body relative to the vertical direction (the direction in which the gravity affects the vehicle body), the centroid sifting means can actively shift the centroid to the opposite side relative to the inclination direction of the vehicle body. The inclining vehicle body can stand upright along the vertical direction. Thereby, the vehicle body can stand upright by itself, although no rider controls the vehicle body in the standstill state, without using any tumble preventing means, such as a stand, an auxiliary wheel, or the like. Further, because of the centroid shifting means, when the vehicle body is inclined to turn, the centroid can be further shifted to the inclination direction. Therefore, the vehicle body can be easily banked in the turning operation, and the light turn performance can be obtained. That is, by providing the centroid shifting means, a function similar to the power steering performance in the turning operation of a motorcycle can be obtained.

Preferably, the vehicle according to this aspect of the present invention further includes an inclination detecting means for detecting inclination of the vehicle body and a control means for controlling the centroid shifting means based upon a result of detection by the inclination detecting means. As thus constructed, the control means can control the centroid shifting means based upon the inclination of the vehicle body detected by the inclination detecting means. Accordingly, the centroid can be properly shifted in response to the inclination angle of the vehicle body.

In the vehicle including the inclination detecting means and the control means, preferably, the control means controls the centroid shifting means to shift the centroid to an opposite side relative to an inclination direction of the vehicle body based upon the result of detection by the inclination detecting means when a vehicle speed is less than a preset speed. As thus constructed, when the vehicle speed is less than the preset speed, the centroid shifting means controlled by the control means can shift the centroid to the opposite side relative to the inclination direction of the vehicle. The inclining vehicle body thus can again easily extend upright along the vertical direction. Thereby, the stagger of the vehicle body can be easily controlled in the running state at a vehicle speed under the preset speed or in the standstill state.

In this regard, the control means controls the centroid shifting means to shift the centroid to the opposite side relative to the inclination direction of the vehicle body based upon the result of detection by the inclination detecting means when the vehicle body is standstill. As thus constructed, when the vehicle is standstill, the centroid shifting means controlled by the control means can shift the centroid to the opposite side relative to the inclination direction. The inclining vehicle body thus can again easily stand upright along the vertical direction. As a result, the vehicle body can easily stand upright by itself in the standstill state.

In the vehicle including the inclination detecting means and the control means, preferably, the control means controls the centroid shifting means to shift the centroid to the same side as the inclination direction of the vehicle body based upon the result of detection by the inclination detecting means when the vehicle body turns. As thus constructed, when the vehicle body turns, the centroid shifting means controlled by the control means can shift the centroid to the same side as the inclination direction of the vehicle. The inclining vehicle body thus can easily further inclines. As a result, the turn performance of the vehicle body can be easily improved.

In the vehicle according to the one aspect of the present invention, preferably, the front frame and the rear frame can pivot relative to each other about an axis extending in a fore to aft direction, and the centroid shifting means makes one of the front frame and the rear frame pivot relative to the other to shift the centroid of the vehicle body. As thus constructed, one of the front frame and the rear frame can be moved relative to each other by making one of the front frame and the rear frame pivot relative to the other. The centroid of the vehicle body thus can be easily shifted.

In this regard, preferably, the centroid shifting means includes a cylinder that makes one of the front frame and the rear frame pivot relative to the other. By using the cylinder as thus constructed, the mechanism of the centroid shifting means can be simplified. Thus, one of the front frame and the rear frame can pivot relative to the other in the simple structure.

In the structure in which the front frame and the rear frame can pivot about the axis extending in the fore to aft direction relative to each other, preferably, the vehicle further includes a torsion spring positioned between the front frame and the rear frame and on the axis extending in the fore to aft direction. As thus constructed, when the vehicle becomes uncontrollable due to malfunction of the centroid shifting means or the control means, or the like, the load of the torsion spring (torsion force) can return the front frame and the rear frame to the initial condition under which both of them do not pivot relative to each other. A side surface of the front wheel and a side surface of the rear wheel can extend parallel to each other. Thus, even though the centroid shifting means or the control means has malfunction, the vehicle can continuously run naturally.

In this regard, preferably, no load is exerted on the torsion spring when a side surface of the front wheel and a side surface of the rear frame extend parallel to each other. As thus constructed, when the vehicle becomes uncontrollable due to malfunction of the centroid shifting means or the control means, or the like, the load of the torsion spring (torsion force) can easily make the side surface of the front wheel and the side surface of the rear wheel extend parallel to each other.

In the structure in which the front frame and the rear frame can pivot about the axis extending in the fore to aft direction relative to each other, preferably, the vehicle further includes a regulating member for regulating a pivot angle of the front frame relative to the rear frame. As thus, constructed, any excessive pivotal movement of the front frame relative to the rear frame can be avoided.

In the structure in which the front frame and the rear frame can pivot about the axis extending in the fore to aft direction relative to each other, preferably, an extended line extended from the axis extending in the fore to aft direction passes through the vicinity of a tangency at which the rear wheel contacts with the ground. When the front frame pivots relative to the rear frame, the rear wheel pivots about the vicinity of the tangency at which the rear wheel contacts with the ground. As thus constructed, any slippage of the rear wheel relative to the ground can be inhibited. Also, when the vehicle turns by inclining the vehicle body, if the centroid shifting means further shifts the centroid in the same direction as the inclination direction of the vehicle body, the rear wheel can incline about the axis. Thus, a steering angle opposing to the turning direction is given to the rear wheel. Thereby, the turning radius in the turn state can be smaller, and the turn performance of the vehicle body can be improved.

In the structure in which the front frame and the rear frame can pivot about the axis extending in the fore to aft direction relative to each other, preferably, the vehicle further includes a bearing positioned between the front frame and the rear frame to support the front frame and the rear frame for pivotal movement relative to each other. As thus constructed, the bearing can make the front frame smoothly pivot about the axis extending in the fore to aft direction.

In this regard, preferably, the front frame includes a head pipe. The head pipe includes a convexed first bearing attaching portion formed to protrude rearward from the head pipe. The head pipe includes a pivot center on the axis extending in the fore to aft direction and an outer circumferential surface to which the bearing is attached. The rear frame includes a concaved second bearing attaching portion disposed to face the convexed first bearing attaching portion of the head pipe. The rear frame includes an inner circumferential surface to which the bearing is attached. As thus constructed, by attaching the bearings to the first bearing attaching portion of the head pipe and the second bearing attaching portion of the rear frame, the front frame can more easily pivot relative to the rear frame.

DETAILED DESCRIPTION OF THE INVENTION

Embodiments of the present invention are now described below, based upon the accompanying drawings.

FIRST EMBODIMENT

Figure 1:
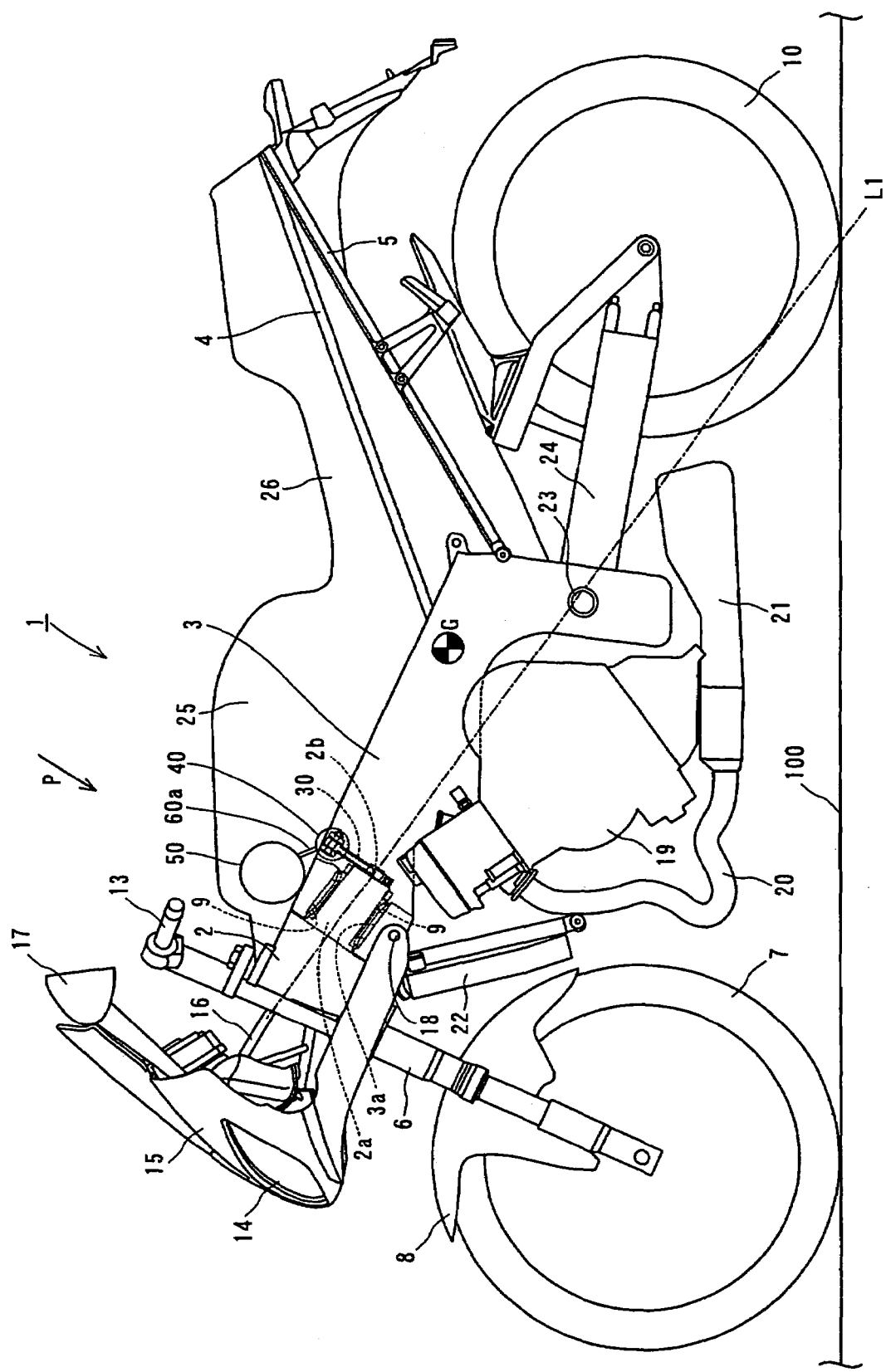
FIG. 1 is a side elevational view, showing an overall structure of a motorcycle according to a first embodiment of the present invention.
Figure 2:
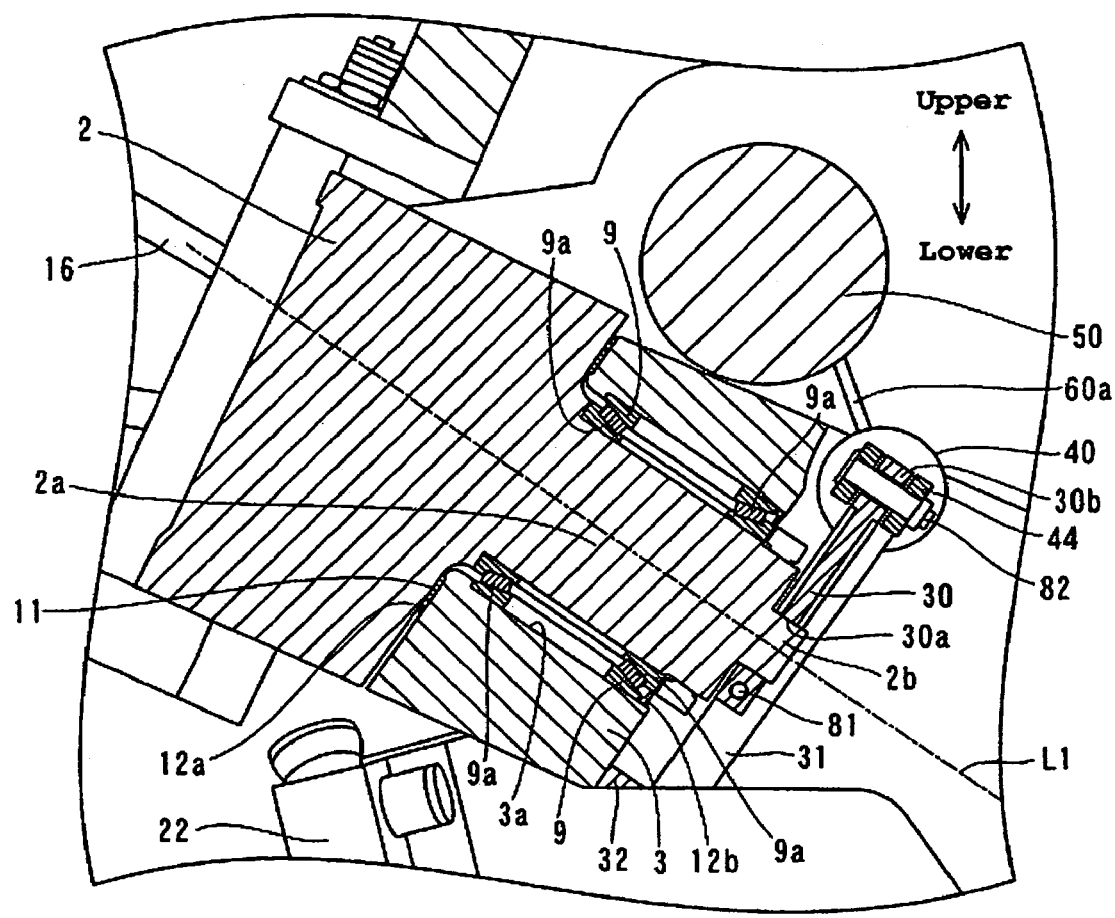
FIG. 2 is a cross sectional view of the vicinity of coupling portions of a head pipe and a main frame of the motorcycle according to the first embodiment shown in FIG. 1.
Figure 3:
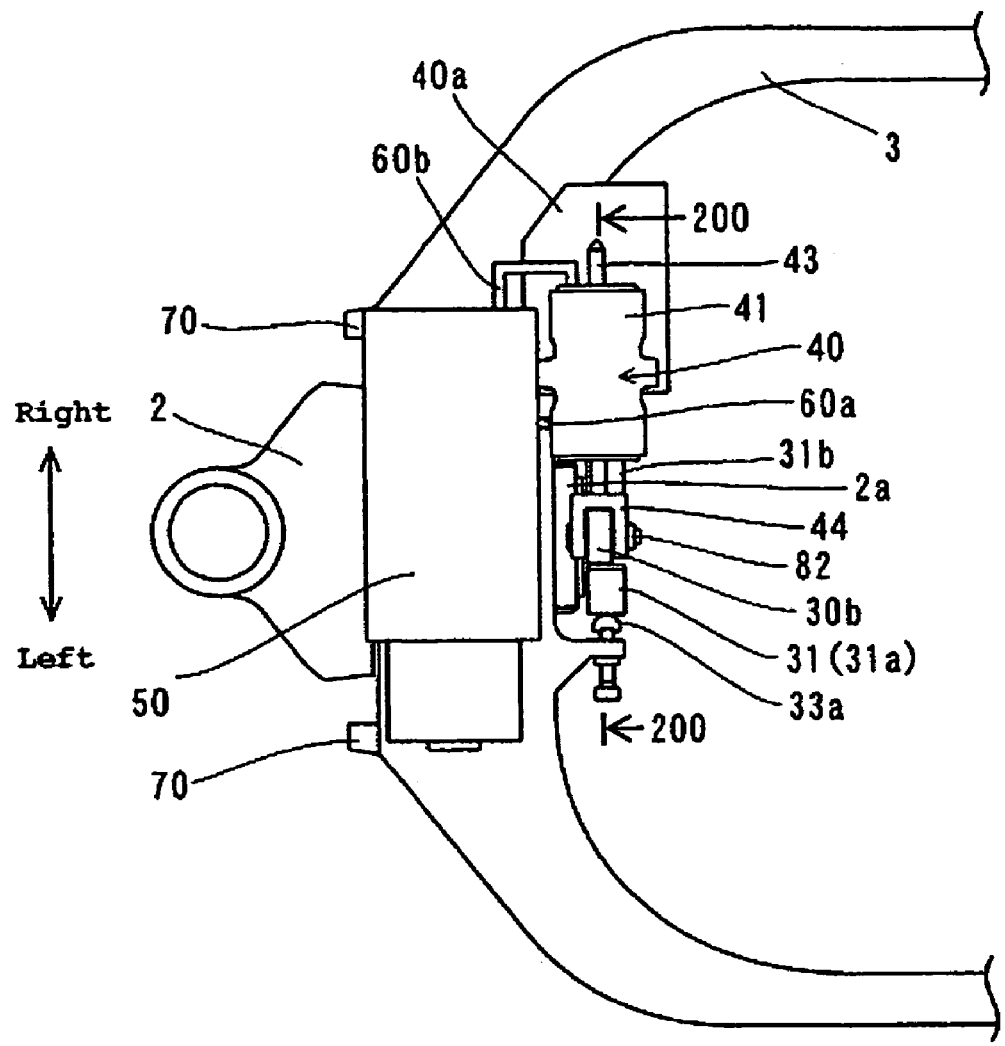
FIG. 3 is an illustration, partially showing a condition viewed in the arrow P direction of FIG. 1.
Figure 4:
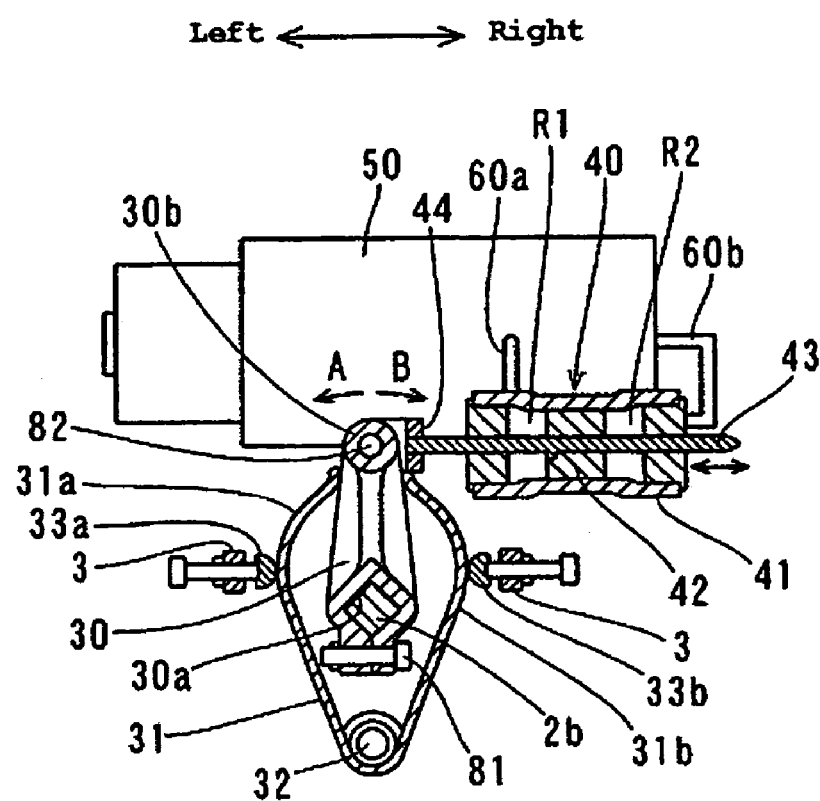
FIG. 4 is a cross sectional view taken along the line 200-200 of FIG. 3.
Figure 5:
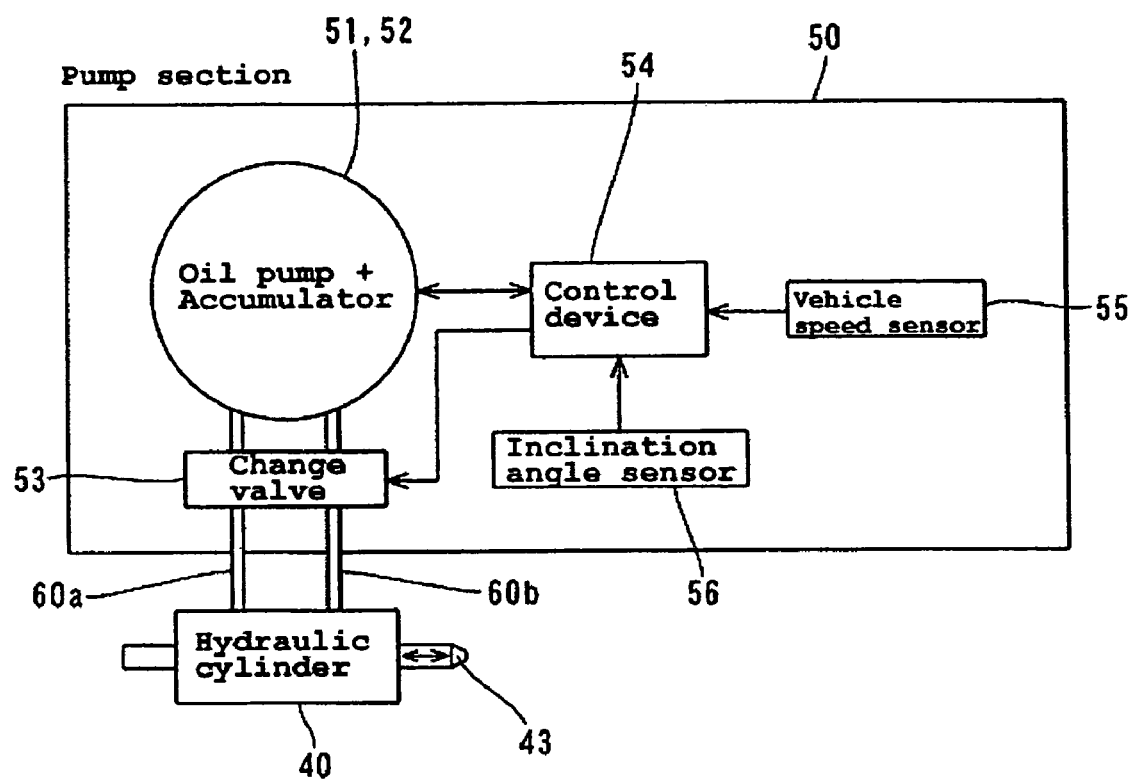
FIG. 5 is a block diagram, showing structures of a pump section and a hydraulic cylinder of the motorcycle according to the first embodiment shown in FIG. 1.

FIG. 1 is a side elevational view, showing an overall structure of a vehicle, such as a motorcycle, according to a first embodiment of the present invention. FIGS. 2-4 are illustrations, showing the vicinity of coupling portions of a head pipe and a main frame of the motorcycle according to the first embodiment shown in FIG. 1. FIG. 5 is a block diagram, showing structures of a pump section and a hydraulic cylinder of the motorcycle according to the first embodiment shown in FIG. 1. Additionally, in the first embodiment, the motorcycle will be described as one example of the vehicle of the present invention. With reference to FIGS. 1-5, a structure of the motorcycle 1 according to the first embodiment of the present invention will be described.

In the motorcycle 1 according to the first embodiment of the present invention, as shown in FIG. 1, a main frame 3 is disposed in the rear of a head pipe 2. Additionally, the head pipe 2 is one example of the "front frame" of the present invention, while the main frame 3 is one example of the "rear frame" of the present invention. The main frame 3 is formed to extend downward rearward. A seat rail 4 is connected to the main frame 3. A backstay 5 extends between a rear portion of the main frame 3 and a rear end portion of the seat rail 4 to be coupled therewith. The head pipe 2, the main frame 3, the seat rail 4 and the backstay 5 together form a vehicle body frame.

Also, a pair of front fork members 6 are disposed under the head pipe 2, wherein each front fork member 6 includes a suspension to absorb shocks in the up and down direction. A front wheel 7 is attached to bottom ends of the front fork members 6 for rotation. A front fender 8 is disposed above the front wheel 7 and covers the front wheel 7.

In this regard, in the first embodiment, as shown in FIG. 2, a rear portion of the head pipe 2 has a cylindrical shaft portion 2a unitarily formed with the rear portion to protrude downward rearward. Additionally, the shaft portion 2a is one example of the "first bearing attaching portion" of the present invention. The main frame 3 has a shaft inserting aperture 3a into which the shaft portion 2a of the head pipe 2 is inserted. Additionally, the shaft inserting aperture 3a is one example of the "second bearing attaching portion" of the present invention. A conical roller bearing (taper roller bearing) 9 having conical rollers 9a is disposed between an outer circumferential surface of the shaft portion 2a of the head pipe 2 and an inner circumferential surface of the shaft inserting aperture 3a. Thus, the head pipe 2 can pivot relative to the main frame 3 about a pivot axis L1 extending in the fore to aft direction of the shaft portion 2a. Additionally, the conical roller bearing 9 is one example of the "bearing" of the present invention, while the pivot axis L1 of the shaft portion 2a of the head pipe 2 is one example of the "axis" of the present invention. Also, the conical roller bearing 9 is positioned in such a manner that a center axis of its own is substantially consistent with the pivot axis L1 extending in the fore to aft direction of the shaft portion 2a of the head pipe 2. Further, as shown in FIG. 1, an extended line of the pivot axis L1 extending in the fore to aft direction extends downward rearward (obliquely downward rearward) and passes through the vicinity of a tangency at which the rear wheel 10 contacts with the ground 100. The centroid G (see FIG. 1) of the motorcycle 1 is positioned above the extended line of the pivot axis L1, when no rider straddles.

As shown in FIG. 2, a thrust washer 11 and a rubber dust seal 12a are situated between the head pipe 2 and a front portion of the main frame 3. A rubber dust seal 12b is also situated on a rear side of an inner circumferential surface of the shaft inserting aperture 3a of the main frame 3. Each dust seal 12a, 12b has a function to inhibit foreign substances from entering the thrust washer 11 or the conical roller bearing 9.

In the first embodiment, as shown in FIGS. 2 and 4, a projection 2b having a rectangular shape in its transverse cross section (see FIG. 4) is unitarily formed with a rear end portion of the shaft portion 2a of the head pipe 2. A pivotal member 30 having a function for transmitting drive force is fixed to the projection 2b by a bolt 81. As shown in FIG. 4, the pivotal member 30 includes an engaging section 30a having a rectangularly shaped aperture which engages with the projection 2b of the shaft portion 2a, and a pivot tip section 30b positioned at a location spaced apart from the engaging section 30a by a certain distance. As shown in FIGS. 2 and 4, a leaf spring 31 disposed to interpose the pivotal member 30 from both sides thereof is attached to the main frame 3 via a support member 32. As shown in FIG. 4, the leaf spring 31 has a spring section 31a abutting on a left lateral side of the pivotal member 30, and a spring section 31b abutting on a right lateral side of the pivotal member 30, both viewed from the rear side of the vehicle body. A pair of position regulating members 33a, 33b opposing to each other and abutting on the spring sections 31a, 31b of the leaf spring 31 are attached to the main frame 3 to limit pivot angles of the pivotal member 30 in respective directions indicated by the arrows A and B. Additionally, the structure is constructed so that the leaf spring 31 and the position regulating members 33a, 33b together keep a neutral position located in both of the directions of the pivotal moment of the pivotal member 30 (the arrow A direction and the arrow B direction). That is, if the pivotal member 30 is absent because of its pivotal movement in the arrow A direction or in the arrow B direction, the spring section 31a or the spring section 31b of the leaf spring 31 provides the pivotal member 30 with a drag affecting the pivotal member 30 toward the neutral position.

In the first embodiment, as shown in FIGS. 2 and 3, a hydraulic cylinder 40 as an actuator making the head pipe 2 pivot relative to the main frame 3 is attached to an upper portion of the main frame 3 through a cylinder bracket 40a (see FIG. 3). Additionally, the hydraulic cylinder 40 is one example of the "cylinder" and the "centroid shifting means" of the present invention. As shown in FIGS. 3 and 4, the hydraulic cylinder 40 includes a tube 41, a piston 42 (see FIG. 4) disposed in a cavity of the tube 41, a piston rod 43 fixed to the piston 42, and a coupling member 44 attached to an end of the piston rod 43. The tube 41 is fixed to the cylinder bracket 40a. As shown in FIG. 4, the piston 42 divides the inner cavity of the tube 41 into two spaces R1 and R2. The respective spaces R1, R2 are filled with oil. The piston rod 43 is disposed to extend through the tube 41. As shown in FIG. 3, the coupling member 44 couples with the pivot tip section 30b of the pivotal member 30 via a bolt 82. In the first embodiment, the tube 41 of the hydraulic cylinder 40 is connected onto the main frame 3 side, while the piston 42 and the piston rod 43 of the hydraulic cylinder 40 is connected to the head pipe 2 through the pivotal member 30. Thereby, in the first embodiment, a linear movement of the piston 42 of the hydraulic cylinder 40 is converted into a pivotal movement of the pivotal member 30 and is transmitted to the shaft portion 2a of the head pipe 2. Thus, the head pipe 2 can pivot relative to the main frame 3 and about the pivot axis L1 (see FIG. 2) of the conical roller bearing 9.

In the first embodiment, as shown in FIGS. 1 and 2, a pump section 50 is disposed in front of and at an obliquely upper location relative to the hydraulic cylinder 40 to deliver oil to the hydraulic cylinder 40. As shown in FIG. 5, the pump section 50 includes an oil pump 52 to which an accumulator 51 is connected, a change valve 53, a control device 54, a vehicle speed sensor 55 and an inclination angle sensor 56. Additionally, the control device 54 is one example of the "control means" of the present invention, while the inclination angle sensor 56 is one example of the "inclination detecting means." The accumulator 51 is constructed to be able to absorb pressure fluctuations occurring within the oil pump 52. The accumulator 51 also has a function for improving and stabilizing a response speed of the hydraulic cylinder 40 by providing pressurization to the hydraulic cylinder 40. When a starter switch (not shown) of the motorcycle 1 is turned on, the accumulator 51 regularly operates until engine 19 stops. The control device 54 is programmed so that control modes of the motorcycle 1 can be changed by a hysteresis control, which will be described below. The inclination angle sensor 56 detects an inclination angle of the vehicle body relative to a perpendicular direction (direction in which the centroid affects the vehicle body) and an inclining velocity (angular velocity), and also has a function for outputting those amounts to the control device 54 as signals such as, for example, current amounts or voltage amounts. For example, a roll sensor, a yaw-rate sensor, or the like can be used as the inclination angle sensor 56. Two hydraulic pipes 60a, 60b connect the hydraulic cylinder 40 and the pump section 50 to each other. As shown in FIG. 4, those two hydraulic pipes 60a, 60b are connected to the spaces R1 and R2 in the tube 41, separated by the piston 42, respectively.

In the first embodiment, as shown in FIG. 3, a pair of stoppers 70 project forward from the main frame 3 to prevent the head pipe 2 from excessively pivoting relative to the main frame 3. Additionally, the stoppers 70 are one example of the "regulating member" of the present invention. Each stopper 70 is formed to contact with the head pipe 2 when the head pipe 2 pivots a certain number of times clockwise or counterclockwise about the pivot axis L1 relative to the main frame 3.

As shown in FIG. 1, a handle bar 13 is attached to the head pipe 2 for pivotal movement. A headlight 14 lighting a forward direction and a front cowling 15 covering a front surface of the head pipe 2 are disposed in front of the head pipe 2. A light stay 16 supporting the headlight 14 is positioned between the headlight 14 and the head pipe 2. Gauges and back mirrors 17 are attached to a top portion of the light stay 16. A lower portion of the front cowling 15 extends downward rearward to be fixed to a vehicle body cover, which is not shown, of the main frame 3 by screws 19.

As shown in FIG. 1, the engine 19 is mounted on a lower portion of the main frame 3. An exhaust pipe 20 is attached to the engine 19. The exhaust pipe 20 curves rightward in a view toward the advance direction and extends downward rearward to be coupled with a muffler 21. A radiator 22 is disposed in front of and above the engine 19 to cool the engine 19. A pivot shaft 23 is disposed at a rear end portion of the main frame 3. The main frame 3 journals a front end portion of a rear arm 24 using the pivot shaft 23 for up and down swing movement. A rear wheel 10 is attached to a rear end portion of the rear arm 24 for rotation. That is, the rear wheel 10 is attached to the main frame 3 through the rear arm 24. This rear wheel 10 has the so-called round tire which bottom surface has an arcuate shape viewed from the advance direction so that the rear wheel 10 inclines relative to the vertical direction when the vehicle body turns. The front wheel 7 also has a round tire similar to the rear wheel 10. A fuel tank 25 is disposed above the main frame 3. A seat 26 is disposed in the rear of the fuel tank 25.

Figure 6:
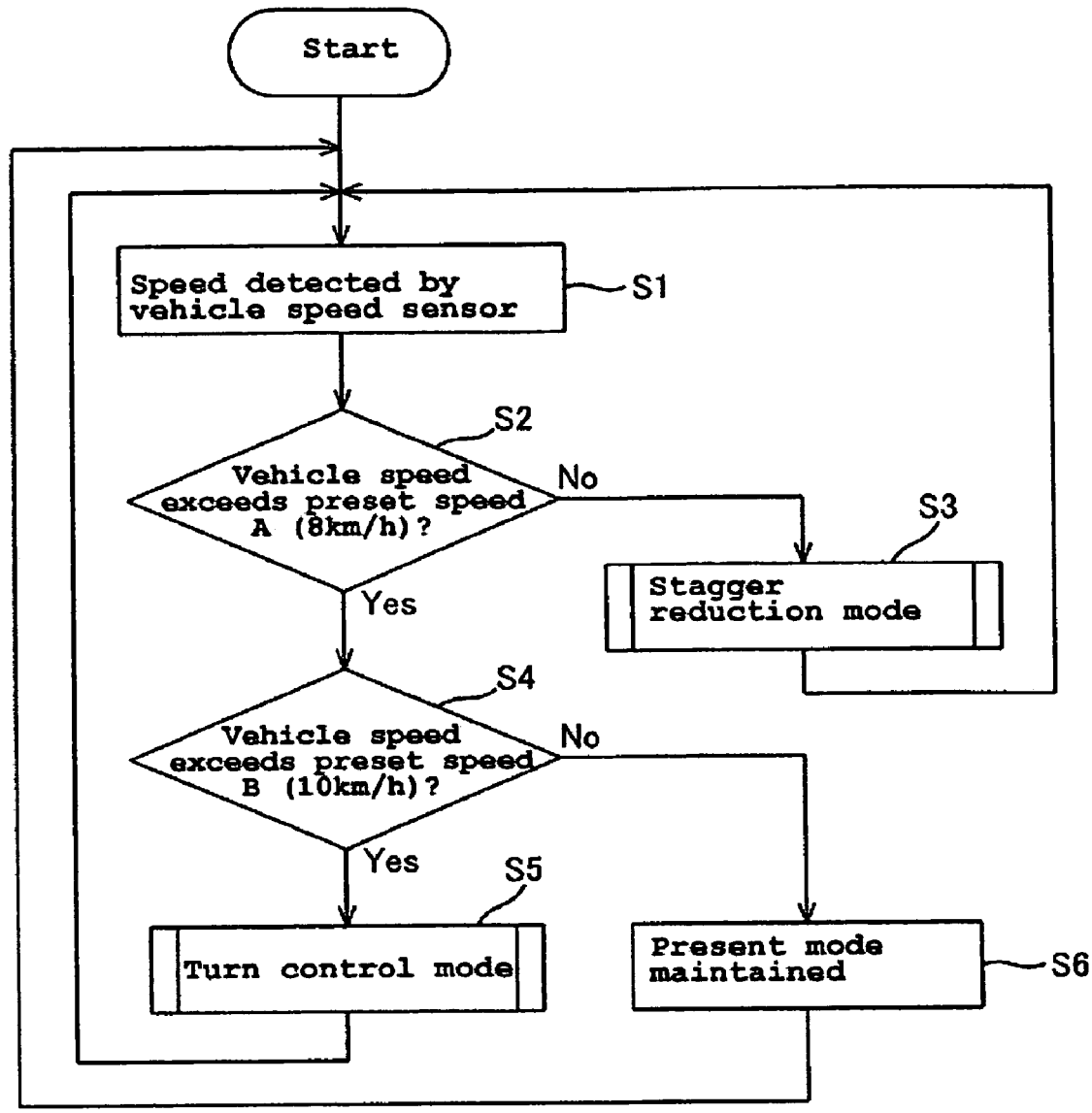
FIG. 6 is a flowchart for describing a changing manner of control modes of the motorcycle which applies a hysteresis control according to the first embodiment of the present invention.

FIG. 6 is a flowchart for describing a changing manner of control modes of the motorcycle which applies a hysteresis control according to the first embodiment of the present invention. In this regard, the "hysteresis control" in the first embodiment means a control manner by which a vehicle speed at which the control modes are changed to one another under an accelerating condition is intentionally shifted to another vehicle speed under a decelerating condition to inhibit frequent change operations from occurring in response to nominal fluctuations of the vehicle speed. Next, with reference to FIG. 6, the changing manner of the control modes of the motorcycle using the hysteresis control according to the first embodiment of the present invention will be described.

First, the rider turns on a starter switch (not shown) of the motorcycle 1; thereby, at a step S1 in the flowchart of FIG. 6, the vehicle speed sensor 55 detects a present speed (vehicle speed) of the motorcycle 1. At a step S2, whether the vehicle speed detected at the step S1 is not smaller than a preset speed A (in the first embodiment, 8 km/h) or not is determined. If it is determined at the step S2 that the vehicle speed is smaller than the preset speed A (8 km/h), the motorcycle 1 is controlled in a stagger reduction mode at a step S3. Additionally, when the starter switch of the motorcycle 1 is turned on, normally, the vehicle body is under the standstill condition (i.e., vehicle speed is 0 km/h), and the motorcycle 1 is controlled in the stagger reduction mode. Afterwards, the program returns back to the step S1, the vehicle speed sensor 55 again detects a present speed (vehicle speed). If it is determined at the step S2 that the vehicle speed is not smaller than the preset speed A (8 km/h), whether the vehicle speed detected at the step S1 is not smaller than another preset speed B (in the first embodiment, 10 km/h) or not is determined at a step S4. If it is determined at the step S4 that the vehicle speed is not smaller than the preset speed B (10 km/h), the motorcycle 1 is controlled in a turn control mode at a step S5. Afterwards, the program returns back to the step S1, the vehicle speed sensor 55 again detects a present speed (vehicle speed). On the other hand, if it is determined at the step S4 that the vehicle speed is smaller than the preset speed B (10 km/h), the control modes are not changed at the step S6 to continuously control the motorcycle 1 in the same mode.

That is, in the first embodiment, by the hysteresis control, under an acceleration condition of the motorcycle 1, the control mode is changed to the turn control mode from the stagger reduction mode at the preset speed B (10 km/h) by the program going through the control path of the steps S3, S1, S2, S4 and S5, and under a deceleration condition of the motorcycle 1, the control mode is changed to the stagger reduction mode from the turn control mode at the preset speed A (8 km/h) by the program going through the control path of the steps S5, S1, S2, and S3. If the vehicle speed is accelerated to a speed more than the preset speed A (8 km/h) from a speed less than the preset speed A (8 km/h), and then the acceleration condition is changed to the deceleration condition before reaching the preset speed B (10 km/h), the control mode is not changed to the turn control mode from the stagger reduction mode, and the stagger reduction control is maintained, by the program going through the control path of the steps S3, S1, S2, S4 and S6. If the vehicle speed is decelerated to a speed less than the preset speed B (10 km/h) from a speed greater than the preset speed B (10 km/h), and then the deceleration condition is changed to the acceleration condition before reaching the preset speed A (8 km/h), the control mode is not changed to the stagger reduction mode from the turn control mode, and the turn control mode is maintained, by the program going through the control path of the steps S5, S1, S2, S4 and S6. By applying such a hysteresis control in which speeds at which control modes are changed intentionally shifted so as to be different in an acceleration state and in a deceleration state from each other, frequent change operations between the control modes are inhibited from occurring in response to nominal fluctuations of the vehicle speed, when the motorcycle 1 runs generally at a fixed speed.

Figure 7:
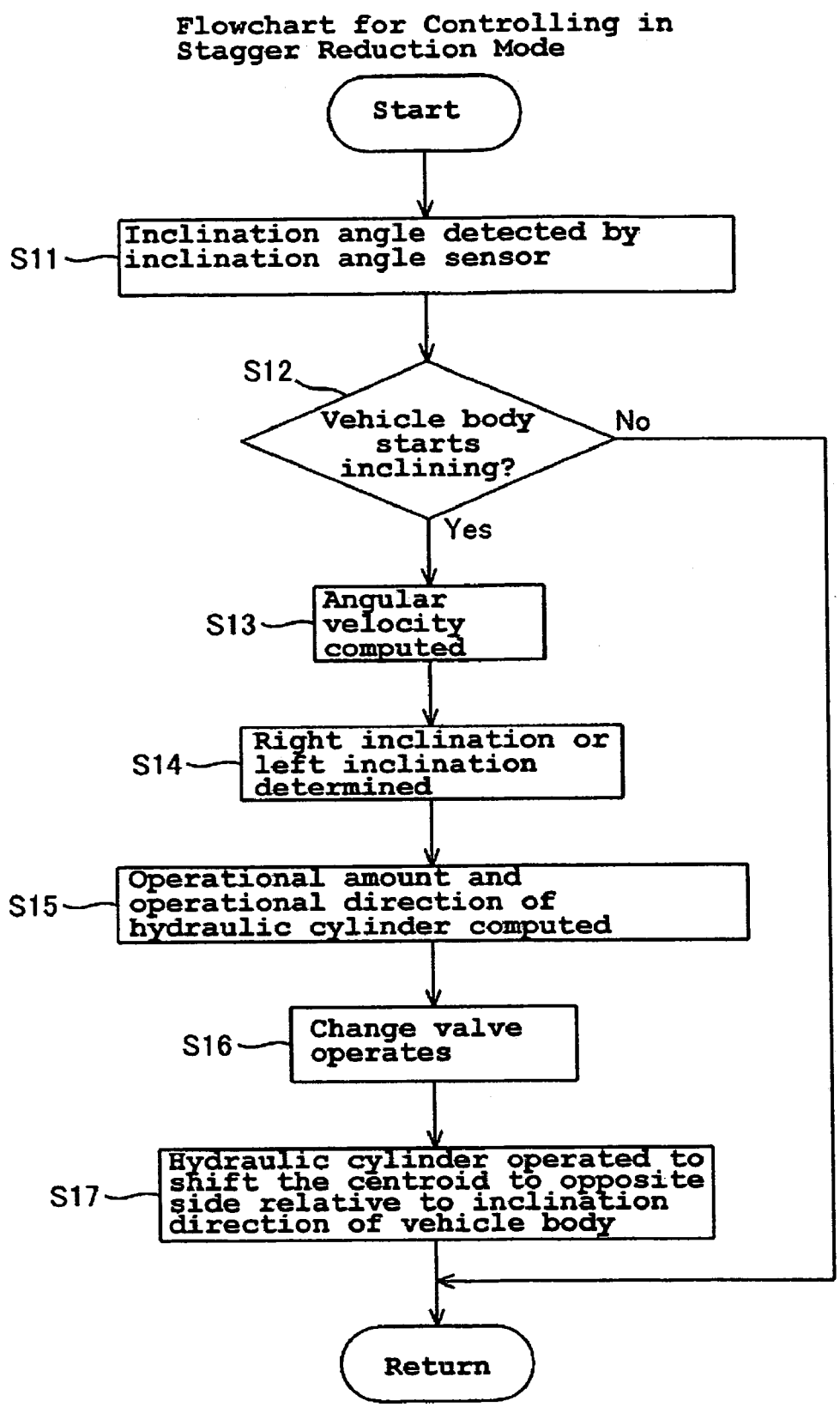
FIG. 7 is a flowchart for describing a control manner of the motorcycle in the stagger reduction mode in the hysteresis control according to the first embodiment of the present invention.

FIG. 7 is a flowchart for describing a control manner of the motorcycle in the stagger reduction mode in the hysteresis control according to the first embodiment of the present invention shown in FIG. 6. Next, with reference to FIGS. 6 and 7, movements of the motorcycle 1 controlled in the stagger reduction mode will be described.

When the motorcycle 1 is controlled in the stagger reduction mode at the step S3 shown in the flowchart of FIG. 6, first, the inclination angle sensor 56 of the pump section 50 detects an inclination angle of the vehicle body at a step S11 of FIG. 7. At a step S12, the control device 54 of the pump section 50 determines whether the vehicle body starts inclining or not. If the control device 54 determines that the vehicle body does not start inclining at the step S12, the program goes to the step S1 shown in the flowchart of FIG. 6. On the other hand, if the control device 54 determines that the vehicle body starts inclining at the step S12 of FIG. 7, the control device 54, at a step S13, computes an inclining velocity (angular velocity) of the vehicle body based upon the inclination angle of the vehicle body detected at the step S11. At a step S14, the control device 54 determines whether the vehicle body inclines rightward or leftward. At a step S15, the control device 54 computes an operational amount (stroke) and an operational direction of the piston 42 of the hydraulic cylinder 40 based upon the inclination angle determined at the step S14. At a step S16, the control device 54 operates the change valve 53. Specifically, the control device 54 computes a displacement amount (stroke) of the piston 42 that is necessary to shift the centroid of the vehicle body for making the vehicle body extend upright, and transmits a signal to the change valve 53 positioned in the hydraulic circuit. Thereby, the change valve 53 operates to allow a certain amount of the oil to be delivered to the inner cavity of the hydraulic cylinder 40 by the oil pump 52. At a step S17, the hydraulic cylinder 40 operates to make the main frame 3 pivot relative to the head pipe 2; thereby, the centroid of the vehicle body shifts to an opposite side relative to the inclination direction. Thus, the vehicle body extends upright.

Figure 8:
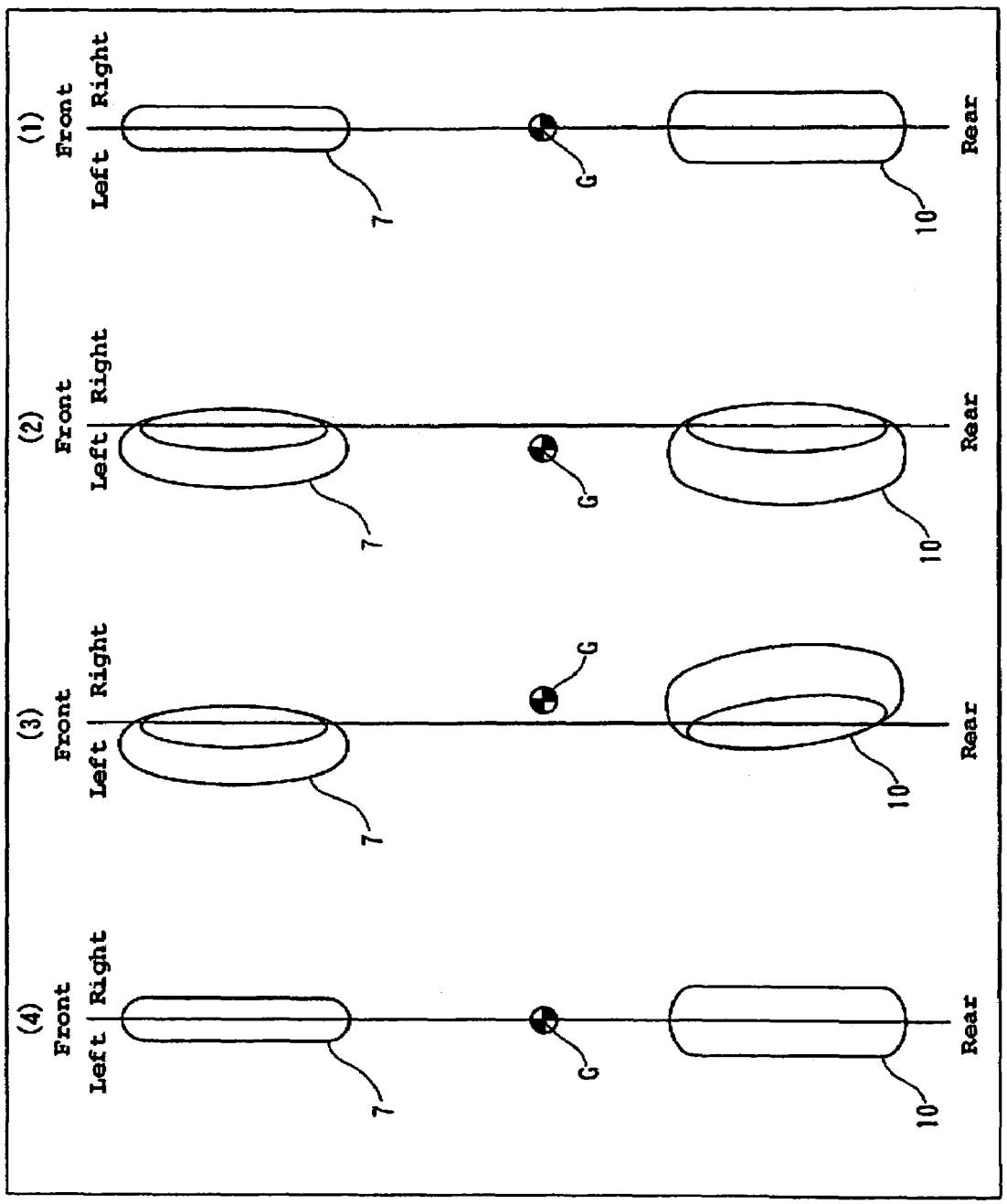
FIG. 8 is a flowchart for describing a movement of the motorcycle in the stagger reduction mode in the hysteresis control according to the first embodiment of the present invention.
Figure 9:
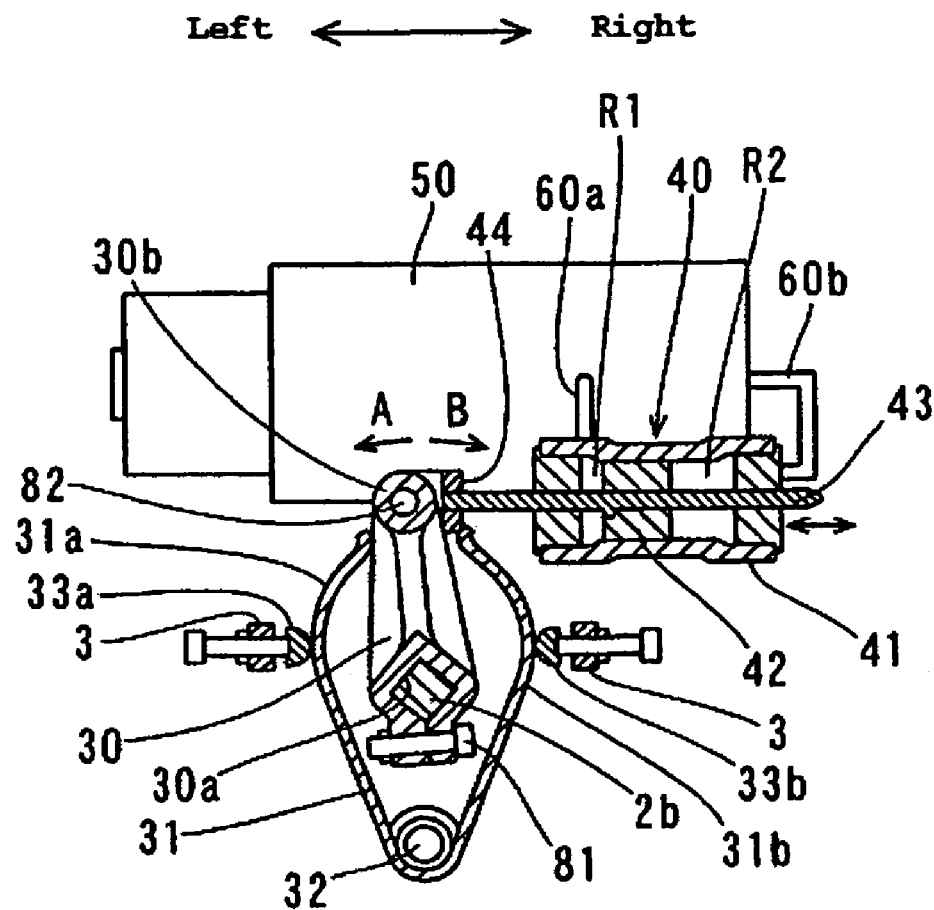
FIG. 9 is a cross sectional view for describing operations of a pump section and a hydraulic cylinder shown in FIG. 5.

FIGS. 8 and 9 are schematic views for describing the movement of the motorcycle in the stagger reduction mode according to the first embodiment shown in FIG. 7. Next, with reference to FIGS. 4, 8 and 9, the centroid shift operation of the vehicle body controlled in the stagger reduction mode will be specifically described. First, when the vehicle body inclines (staggers) leftward as shown in FIG. 8(2) from a condition under which the vehicle body extends upright as shown in FIG. 8(1), the oil pump 52 delivers a certain amount of the oil to the space R2 (see FIG. 4) on the right side in the cavity of the hydraulic cylinder 40. Thereby, the piston 42 and the piston rod 43 of the hydraulic cylinder 40 shown in FIG. 4 move leftward, and the pivotal member 30 pivots counterclockwise (the arrow A direction) while the projection 2b of the shaft portion 2a engaging with the engaging section 30a functions as a fulcrum so that the condition of FIG. 9 is brought. Thereby, the head pipe 2 pivots counterclockwise relative to the main frame 3. This means that the main frame 3 pivots clockwise relative to the head pipe 2 about the pivot axis L1. Thus, as shown in FIG. 8(3), the centroid G of the vehicle body shifts to the right side from the left side. The front wheel 7 moves rightward with the shift of the certroid G of the vehicle body to the right side. On this occasion, under the condition shown in FIG. 9, the control device 54 controls the oil pump 52 to deliver a certain amount of the oil to the space R1 on the left side in the cavity of the hydraulic cylinder 40; thereby, the piston 42 and the piston rod 43 move rightward. The pivotal member 30 thus pivots clockwise (the arrow B direction) while the projection 2b of the shaft portion 2a engaging with the engaging section 30a functions as the fulcrum. Accordingly, the centroid G shown in FIG. 8(3) shifts leftward, and the rear wheel 10 moves leftwards. As a result, as shown in FIG. 8(4), a side surface of the front wheel 7 and a side surface of the rear wheel 10 extend parallel to each other, and the vehicle body extends upright.

When the vehicle body inclines (staggers) rightward, the oil pump 52 supplies a certain amount of the oil to the space R1 (see FIG. 4) on the left side in the cavity of the hydraulic cylinder 40. The main frame 3 therefore pivots counter-clockwise relative to the head pipe 2 about the pivot axis L1, and the centroid G of the vehicle body shifts to the left side from the right side. By controlling the motorcycle 1 so that a counter operation which is plane symmetrical relative to the centroid shift operation shown in FIG. 8 is made, the side surface of the front wheel 7 and the side surface of the rear wheel 10 extend parallel to each other, and the vehicle body extends upright. As thus discussed, the motorcycle 1 in the standstill state is controlled in the stagger reduction mode.

Figure 10:
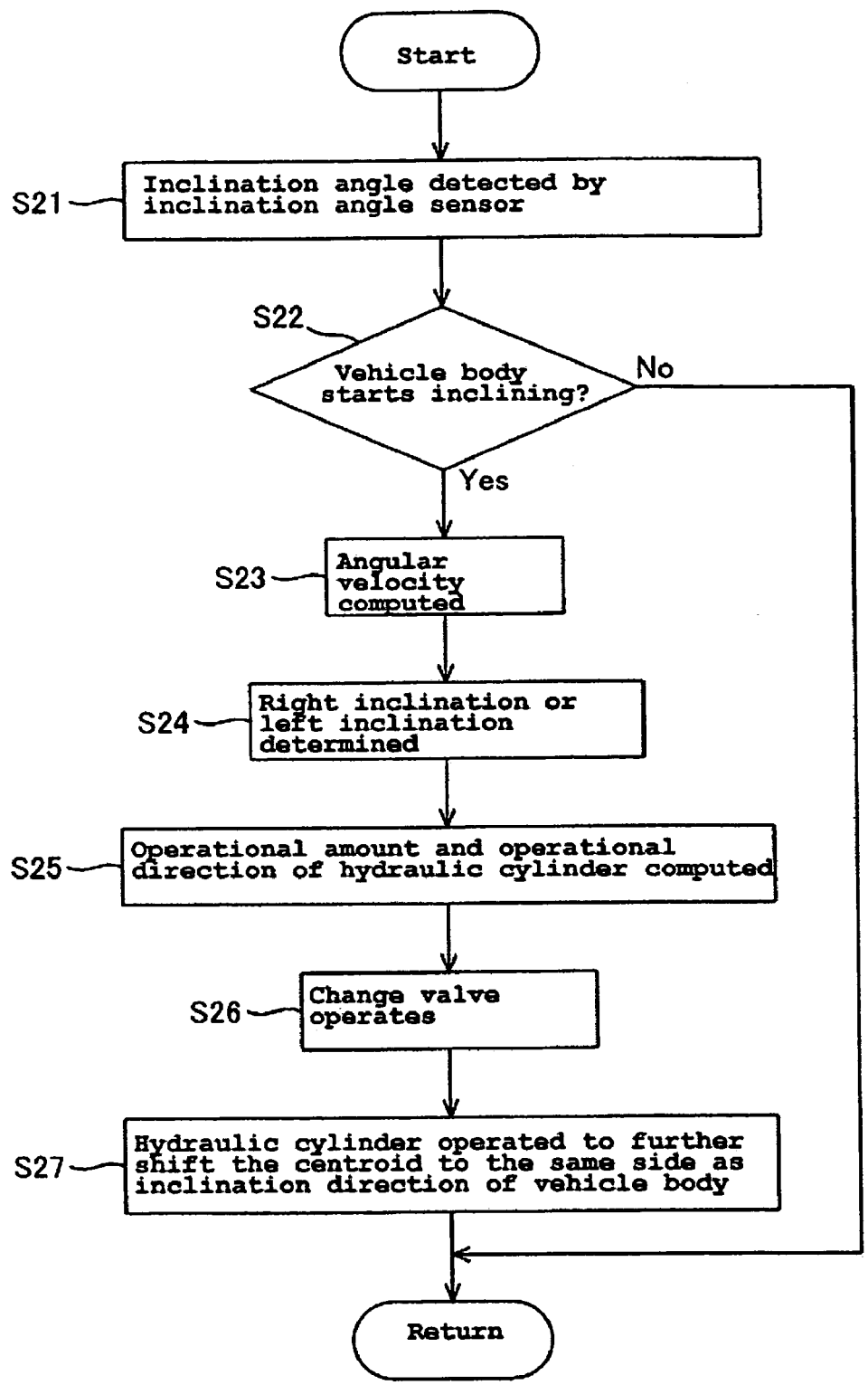
FIG. 10 is a flowchart for describing a control manner of the motorcycle in the turn control mode in the hysteresis control according to the first embodiment shown in FIG. 6.

FIG. 10 is a flowchart for describing a control manner of the motorcycle in the turn control mode in the hysteresis control according to the first embodiment shown in FIG. 6. Next, with reference to FIG. 10, movements of the motorcycle 1 in a turn state and controlled in the turn control mode will be described. When the motorcycle 1 is controlled in the turn control mode at the step S5 shown in the flowchart of FIG. 6, first, the inclination angle sensor 56 of the pump section 50 detects an inclination angle of the vehicle body at a step S21 of FIG. 10. At a step S22, based upon the inclination angle of the vehicle body detected at the step S21, the control device 54 of the pump section 50 determines whether the vehicle body starts inclining or not. If the control device 54 determines that the vehicle body does not start inclining at the step S22, the program goes to the step S1 shown in the flowchart of FIG. 6. On the other hand, if the control device 54 determines that the vehicle body starts inclining at the step S22 of FIG. 10, the control device 54, at a step S23, computes an inclining velocity (angular velocity) of the vehicle body based upon the inclination angle of the vehicle body detected at the step S21. At a step S24, the control device 54 determines whether the vehicle body inclines rightward or leftward. At a step S25, the control device 54 computes an operational amount (stroke) and an operational direction of the piston 42 of the hydraulic cylinder 40 based upon the inclination angle determined at the step S24. At a step S26, the control device 54 operates the change valve 53. Specifically, the control device 54 computes a displacement amount (stroke) of the piston that is necessary to shift the centroid of the vehicle body for improving the turn performance of the vehicle body, and transmits a signal to the change valve 53 positioned in the hydraulic circuit. Therefore, the change valve 53 operates to allow a certain amount of the oil to be delivered to the inner cavity of the hydraulic cylinder 40 by the oil pump 52. At a step S27, the hydraulic cylinder 40 operates to make the main frame 3 pivot relative to the head pipe 2 and the centroid of the vehicle body further shifts to an opposite side relative to the inclination direction. Accordingly, because the vehicle body further inclines toward the turn direction against the gyro-moment generated by the gyro-effect, the bank of vehicle body in the turn state is lighter so that the light turn performance can be obtained. That is, the function like the power steering performance of the motorcycle can be obtained.

Figure 11:
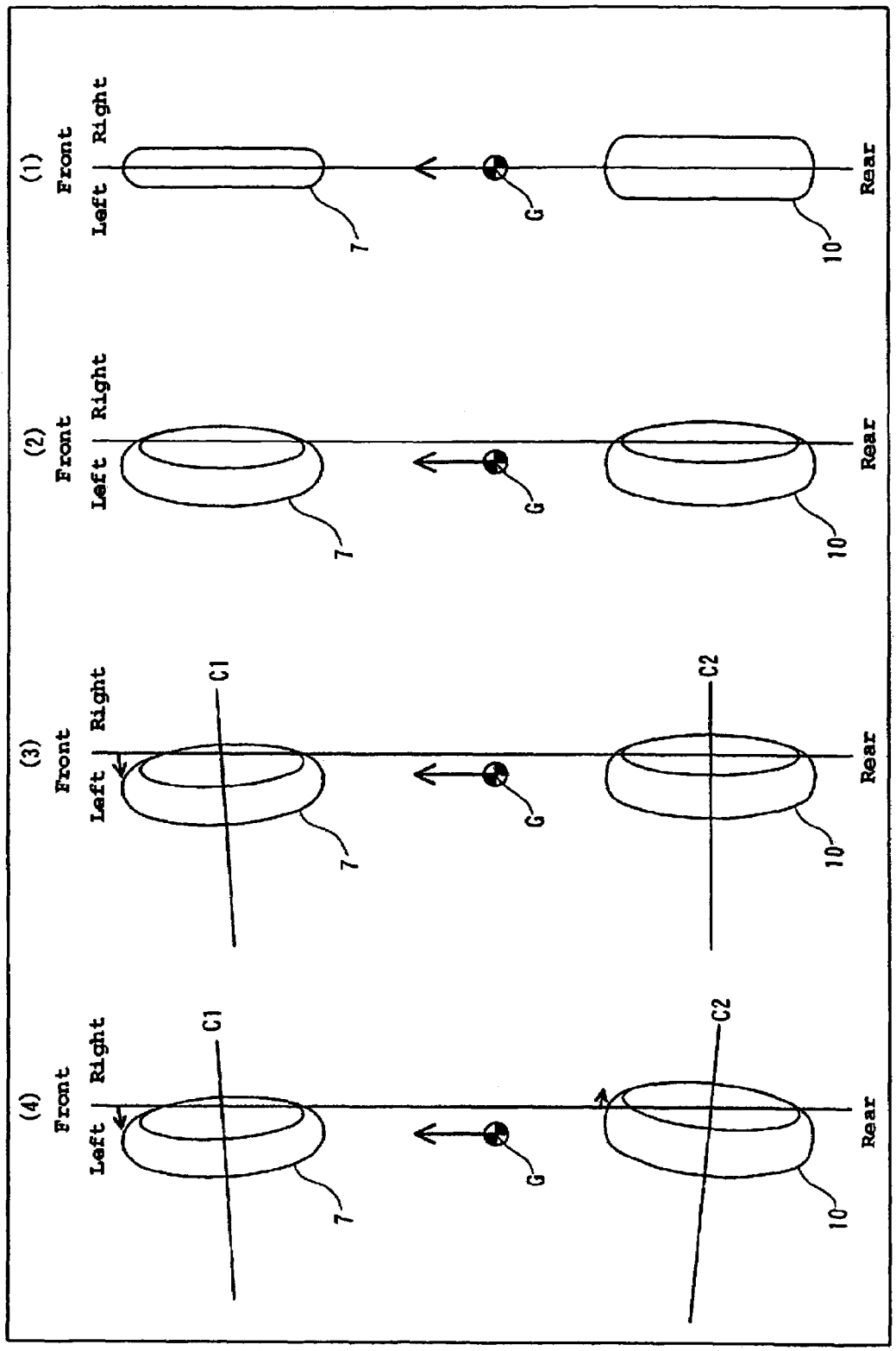
FIG. 11 is a schematic view for describing the movement of the motorcycle in the turn control mode according to the first embodiment shown in FIG. 10.

FIG. 11 is a schematic view for describing the movement of the motorcycle in the turn control mode according to the first embodiment shown in FIG. 10. Next, with reference to FIGS. 4 and 11, the centroid shift operation of the vehicle body controlled by the turn control mode will be specifically described. First, the motorcycle 1 turns leftward with the vehicle body inclining leftward as shown in FIG. 11(2), from a condition under which the vehicle body goes straight ahead as shown in FIG. 11(1). In this state, as shown in FIG. 11(3), the front wheel 7 is given with a steering angle in the leftward direction. The control device 54 controls the oil pump 52 to deliver a certain amount of the oil to the space R1 (see FIG. 4) on the left side in the cavity of the hydraulic cylinder 40. Thereby, the piston 42 and the piston rod 43 of the hydraulic cylinder 40 move rightward, and the pivotal member 30 pivots clockwise (the arrow B direction) while the projection 2b of the shaft portion 2a engaging with the engaging section 30a functions as the fulcrum. Thereby, the head pipe 2 pivots clockwise relative to the main frame 3. This means that the main frame 3 pivots counterclockwise relative to the head pipe 2 about the pivot axis L1. Thus, as shown in FIG. 11(4), the centroid G of the vehicle body further shifts to the left side, and the rear wheel is given with a minute steering angle by the vehicle body being twisted. Thereby, the steering angle and a camber thrust are given to the rear wheel 10, and an angle made between the center axis C1 of the rotation of the front wheel 7 and the center axis C2 of the rotation of the rear wheel 10 becomes larger. Accordingly, the turn radius of the vehicle body becomes smaller.

When the motorcycle 1 turns right with the vehicle body inclining rightward, the oil pump 52 delivers a certain amount of the oil to the space R2 (see FIG. 4) on the right side in the cavity of the hydraulic cylinder 40. Thereby, the main frame 3 pivots clockwise relative to the head pipe 2 about the pivot axis L1, and the centroid G of the vehicle body further shifts to the right side. The motorcycle 1 is controlled so that a counter operation which is plane symmetrical relative to the centroid shift operation shown in FIG. 11 is made. Thus, the steering angle in the leftward direction and the camber thrust are given to the rear wheel 10, and an angle made between the center axis C1 of the rotation of the front wheel 7 and the center axis C2 of the rotation of the rear wheel 8 becomes larger. Accordingly, the turn radius of the vehicle body becomes smaller. As thus discussed, the movement of the motorcycle 1 in the turn state is controlled in the turn control mode.

In the first embodiment, as discussed above, the motorcycle 1 has hydraulic cylinder 40 for shifting the centroid G of the vehicle body by making the main frame 3 supporting the rear wheel 10 relative to the head pipe 2 supporting the front wheel 7. Thus, when the vehicle runs at a slow speed, even though the centroid G of the vehicle body shifts sideways (the width direction of the vehicle body) regardless of the intension of a rider to incline the vehicle body relative to the vertical direction, the hydraulic cylinder 40 can actively shift the centroid G to an opposite side relative to the inclination direction of the vehicle body. The inclining vehicle body thus can again extend upright along the vertical direction. Thereby, the stagger of the vehicle body can be controlled in the slow speed running state.

Also, in the first embodiment, as discussed above, because having the hydraulic cylinder 40 for shifting the centroid G of the vehicle body by moving the main frame 3 relative to the head pipe 2, when the vehicle is standstill, even though the centroid G of the vehicle body shifts sideways (the width direction of the vehicle body) to incline the vehicle body relative to the vertical direction (the direction in which the gravity affects the vehicle body), the hydraulic cylinder 40 can actively shift the centroid G to the opposite side relative to the inclination direction of the vehicle body. The inclining vehicle body thus can again stand upright along the vertical direction. Thereby, the vehicle body can stand upright by itself, although no rider controls the vehicle body in the standstill state, without using any tumble preventing means, such as a stand, an auxiliary wheel, or the like.

Further, in the first embodiment, as discussed above, because having the hydraulic cylinder 40 for shifting the centroid G of the vehicle body, when the vehicle body is inclined to turn, the centroid G can be further shifted to the inclination direction. Thereby, the vehicle body can be easily banked in the turning operation, and the light turn performance can be obtained. That is, by providing the hydraulic cylinder 40 for shifting the centroid G of the vehicle body, the function like the power steering performance in the turning operation of a motorcycle can be obtained.

In the first embodiment, as discussed above, because having the hydraulic cylinder 40 for shifting the centroid G of the vehicle body, when the vehicle body is inclined to turn, the rear wheel 10 can incline about the pivot axis L1 by the hydraulic cylinder 40 further shifting the centroid G to the same direction as the inclination direction. Thereby, the turn radius in the turn state can be smaller. Accordingly, the turn performance of the vehicle body can be improved.

Figure 12:
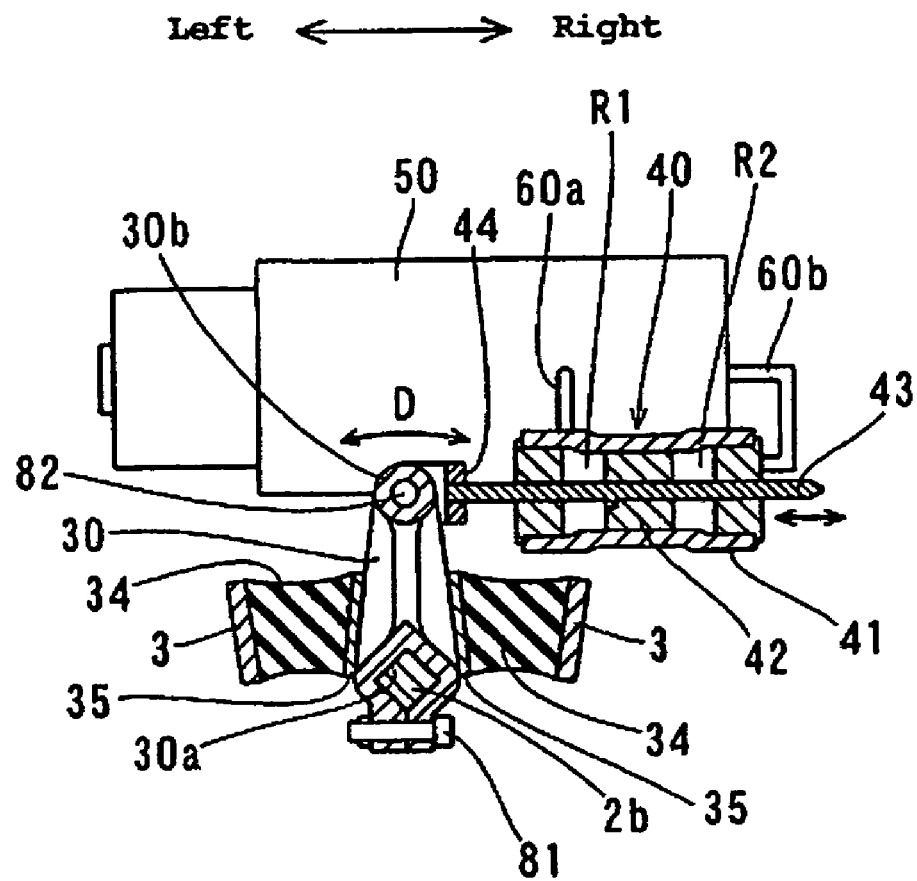
FIG. 12 is a cross sectional view, showing the vicinity of an alternative pivotal member according to the first embodiment of the present invention.

FIG. 12 is a cross sectional view showing the vicinity of an alternative pivotal member according to the first embodiment of the present invention. With reference to FIGS. 4 and 12, in this alternative of the first embodiment, the neutral position of the pivotal member 30 is kept using an elastic member 34, such as, for example, a rubber member as shown in FIG. 12, differently from the first embodiment in which the neutral position of the pivotal member 30 is kept using the leaf spring 31 of FIG. 4. That is, a pair of elastic members 34 made of a rubber material or the like are attached to the main frame 3. An abutting member 35 abutting on a side surface of the pivotal member 30 is attached to each elastic member 34. In the alternative of the first embodiment, by positioning the pair of elastic members 34 having the abutting members 35 attached, on the respective side surfaces, the neutral position of the pivotal member 30 in the pivotal direction (i.e., the D direction of FIG. 12) can be easily maintained.

SECOND EMBODIMENT

Figure 13:
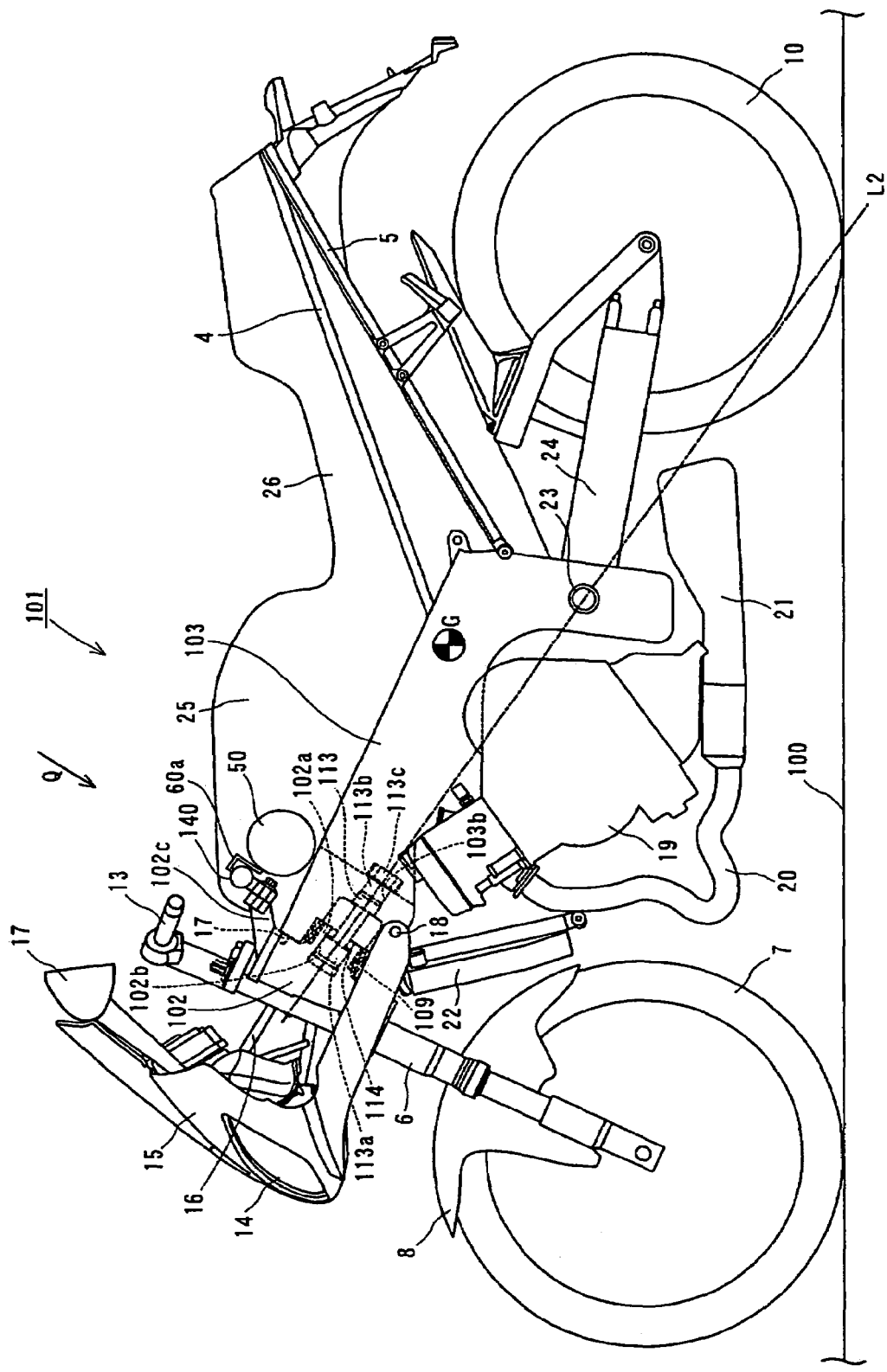
FIG. 13 is a side elevational view, showing an overall structure of a motorcycle according to a second embodiment of the present invention.
Figure 14:
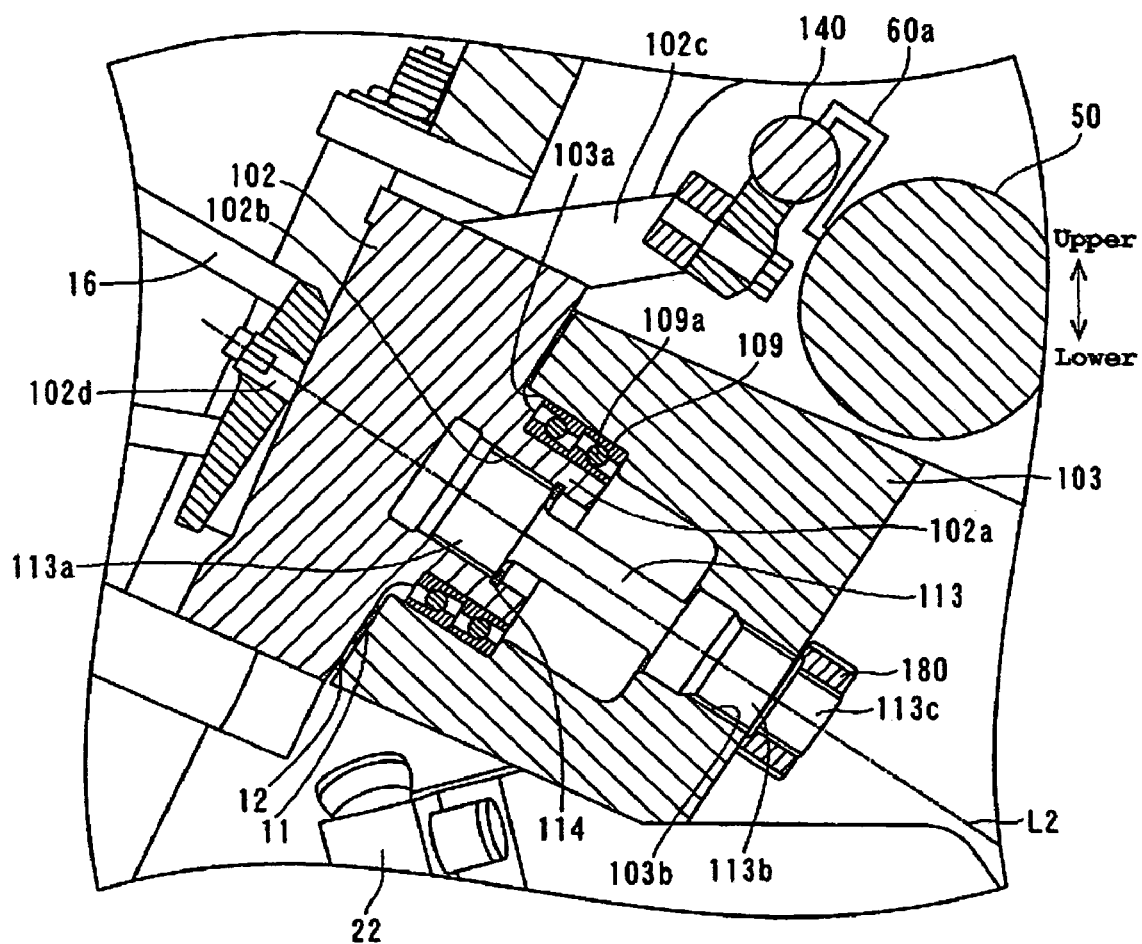
FIG. 14 is cross sectional view of the vicinity of the coupling portions of the head pipe and the main frame of the motorcycle according to the second embodiment shown in FIG. 13.
Figure 15:
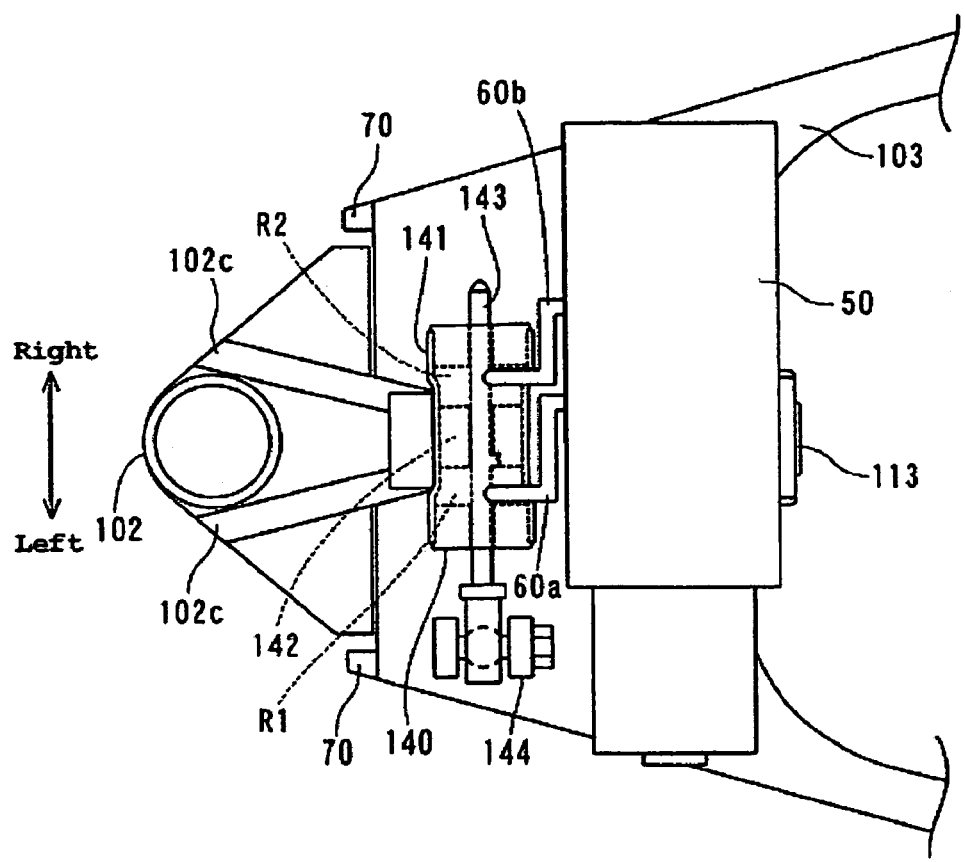
FIG. 15 is an illustration, partially showing a condition viewed in the arrow Q direction of FIG. 13.

FIGS. 13-15 are illustrations showing a structure of a motorcycle according to a second embodiment of the present invention. With reference to FIGS. 13-15, the structure of the motorcycle 101 in which the head pipe 102 and the main frame 103 together forming the vehicle body are coupled with each other through a torsion spring 113 will be described in this second embodiment. Additionally, constructions other than the coupling portions where the head pipe 102 and the main frame 103 are coupled in accordance with the second embodiment and the control manner in which the movement of the motorcycle 101 are the same as those which apply to the motorcycle 1 according to the first embodiment.

That is, in the second embodiment, as shown in FIG. 14, a rear portion of the head pipe 102 has a cylindrical shaft portion 102a unitarily formed with the rear portion to protrude downward rearward. Additionally, the shaft portion 102a is one example of the "first bearing attaching portion" of the present invention. The main frame 103 has a shaft inserting portion 103a into which the shaft portion 102a of the head pipe 102 is inserted. Additionally, the shaft inserting portion 103a is one example of the "second bearing attaching portion" of the present invention. An angular bearing 109 having spherical balls 109a is disposed between an outer circumferential surface of the shaft portion 102a of the head pipe 102 and an inner circumferential surface of the shaft inserting portion 103a of the main frame 103. Therefore, the head pipe 102 can pivot relative to the main frame 103 about a torsion axis L2 extending in the fore to aft direction of the shaft portion 102a. Additionally, the torsion axis L2 of the shaft portion 102a of the head pipe 102 is one example of the "axis" of the present invention. Further, the angular bearing 109 is an example of the "bearing" of this invention. Also, the angular bearing 109 is positioned in such a manner that a center axis of its own is substantially consistent with the torsion axis L2 extending in the fore to aft direction of the shaft portion 102a of the head pipe 2. Further, as shown in FIG. 13, an extended line of the torsion axis L2 extending in the fore to aft direction extends downward rearward (obliquely downward rearward) and passes through the vicinity of the tangency at which the rear wheel 10 contacts with the ground 100. The centroid G of the motorcycle 101 is positioned above the extended line of the torsion axis L2, when no rider straddles.

In the second embodiment, as shown in FIG. 14, the head pipe 102 and the main frame 103 are coupled with each other through the torsion spring 113. As an attaching structure of the torsion spring 113, first, a spline hole 102b having grooves is formed at the shaft portion 102a of the head pipe 102. A spline shaft section 113a of a front portion of the torsion spring 113 is inserted into the spline hole 102b. The spline shaft section 113a of the torsion spring 113 is machined to have the spline corresponding to the grooves of the spline hole 102b. Thereby, the front portion of the torsion spring 113 is fixed to the shaft portion 102a of the head pipe 102 so as to pivot together with the shaft portion 102a. A C-ring 114 is fitted into a rear side portion of the spline hole 102b of the head pipe 102 to prevent the torsion spring 113 from coming off rearward. Another spline hole 103b having grooves is also formed at a portion of the main frame 103 to which the torsion spring 113 is attached. A spline shaft section 113b of a rear portion of the torsion spring 113 is inserted into the spring hole 103b. The spline shaft section 113b of the torsion spring 113 is machined to have the spline corresponding to the grooves of the spline hole 103b. Thereby, the rear portion of the torsion spring 113 is fixed to the main frame 103 so as to pivot together with the main frame 103. A rear end portion of the torsion spring 113 has a screw section 113c. The screw section 113c of the torsion spring 113 is fixed to an inner side front surface of the main frame 103 by a nut 180. The torsion spring 113 is constructed in such a manner that it is under the no-loaded condition (under a condition that the torsion angle is zero) when the side surface of the front wheel 7 and the side surface of the rear wheel 10 extend parallel to each other, while it is under a loaded condition when the side surface of the front wheel 7 and the side surface of the rear wheel 10 do not extend parallel to each other because of the pivotal movement of the head pipe 102 relative to the main frame 103. Additionally, the torsion stiffness is adjustable by exchanging the torsion spring 113 for another one.

In the second embodiment, as shown in FIGS. 14 and 15, a cylinder support 102c is unitarily formed with the upper portion of the head pipe 102 to extend obliquely upward rearward. A hydraulic cylinder 140 as an actuator making the head pipe 102 pivot relative to the main frame 103 is attached to an upper portion of the cylinder support 102c. Additionally, the hydraulic cylinder 140 is one example of the "cylinder" and the "centroid shifting means" of the present invention. As shown in FIG. 15, the hydraulic cylinder 140 includes a tube 141, a piston 142 disposed in an cavity of the tube 141, a piston rod 143 fixed to the piston 142, and a piston rod support 144 supporting an end portion of the piston rod 143. The tube 141 is fixed to the cylinder support 102c. The piston 142 divides the inner cavity of the tube 141 into two spaces R1 and R2. The respective spaces R1, R2 are filled with oil. The piston rod 142 is disposed to extend through the tube 141. The piston rod support 144 is fixed to a top of the main frame 103. That is, in the second embodiment, differently from the first embodiment described above, the tube 141 of the hydraulic cylinder 140 is connected to the head pipe 102 side, while the piston 142 and the piston rod 143 of the hydraulic cylinder 140 is connected to the main frame 103 side. The piston rod support 144 is coupled with the end portion of the piston rod 143 through a ball joint. The ball joint is provided so that the piston rod 143 inserted into the tube 141 can move in a rightward or leftward direction (see FIG. 15) relative to the piston rod support 144 when the tube 141 pivots arcuately about the torsion axis L2 (see FIG. 14) of the angular bearing 109. Thereby, because an arcuate movement is changed to a linear movement, the piston rod 143 and the piston 142 can smoothly move in the cavity of the tube 141.

In the second embodiment, the pump section 50 for delivering oil to the hydraulic cylinder 140 is disposed in the rear of and at an obliquely lower location relative to the hydraulic cylinder 140. The hydraulic cylinder 140 and the pump section 50 are connected to each other through hydraulic pipes 60a, 60b.

In the second embodiment, as discussed above, the head pipe 102 and the main frame 103 are coupled with each other through the torsion spring 113; thereby, even if the stagger reduction control mode or the turn control mode is not available to the motorcycle 101 due to malfunction of the control device 54 of the pump section 50 or the like, the load of the torsion spring 113 (torsion force) can return the head pipe 102 and the main frame 103 to an initial state in which those do not pivot relative to each other. Thus, the side surface of the front wheel 7 and the side surface of the rear wheel 10 can extend parallel to each other. As a consequent, the motorcycle 101 can naturally continue its running state even if the control device 54 of the pump section 50 has a malfunction.

Additionally, other effects of the second embodiments are the same as those of the first embodiment described above.

Additionally, it should be understood that the embodiments disclosed this time are merely examples and do not limit anything by all means. The scope of the present invention is not recited in the description of the embodiments but in the following claims and can involve all variations in the claims and in meanings of equivalents and the scope thereof.

For instance, in the embodiments discussed above, the example is described in which the pump section includes the change valve, the control device, vehicle speed sensor and the inclination angle sensor. The present invention, however, is not limited to those embodiments, and an engine control unit (ECU), for example, can include the control device, the vehicle speed sensor, and the inclination angle sensor.

In the embodiments, the example is described in which the control modes of the motorcycle corresponding to the vehicle speed are automatically changed to one another using the hysteresis control. The present invention, however, is not limited to those embodiments, and the control modes can be changed to one another at will of the rider using a manual type switch, such as, for example, a manual switch. In this regard, preferably, at least the stagger control can be off whenever the vehicle speed exceeds a preset speed.

In the embodiments, the hydraulic cylinder is used as the actuator. The present invention, however, is not limited to those embodiments, and an electrically operable actuator, such as, for example, an electric motor can be used.

In the embodiments, the example is described in which, in the hysteresis control, the preset speed A at which the control mode is changed to the stagger reduction control from the turn control mode is set at 8 km/h and the preset speed B at which the control mode is changed to the turn control mode from the stagger reduction control is set at 10 km/h. The present invention, however, is not limited to those embodiments, and, in the hysteresis control, the preset speed A at which the control mode is changed to the stagger reduction control from the turn control mode can be set at any speed other than 8 km/h and the preset speed B at which the control mode is changed to the turn control mode from the stagger reduction control can be set at any speed other than 10 km/h. Additionally, however, to make the hysteresis control, the preset speed B at which the control mode is changed to the turn control mode from the stagger reduction mode is preferably larger than the preset speed A at which the control mode is changed to the stagger reduction mode from the turn control mode.

Moreover, in the first embodiment, the example is described in which the conical roller bearing (taper roller bearing) is used to support the head pipe and the main frame for pivotal movement relative to each other. In the second embodiment, the example is described in which the angular bearing is used to support the head pipe and the main frame for pivotal movement relative to each other. The present invention, however, is not limited to those embodiments, and, to support the head pipe and the main frame for pivotal movement relative to each other, the angular bearing can be used in the motorcycle of the first embodiment, while the conical roller bearing can be used in the motorcycle of the second embodiment. Also, to support the head pipe and the main frame for pivotal movement relative to each other, bearings other than the conical roller bearing and the angular bearing can be used in the motorcycles of the first and second embodiments.

The invention claimed is:

1. A vehicle, comprising:
a front frame supporting a front wheel, wherein the front frame extends lengthwise in a fore to aft direction of a vehicle body;
a rear frame supporting a rear wheel, wherein the rear frame extends lengthwise in the fore to aft direction of the vehicle body, the front frame being movably attached to the rear frame;
a centroid shifting means for shifting a centroid of the vehicle body by moving one of the front frame and the rear frame relative to the other, wherein the front frame and the rear frame pivot relative to each other about an axis extending in a fore to aft direction of the vehicle body;
an inclination detecting means for detecting inclination of the vehicle body; and
a control means for controlling the centroid shifting means based upon a result of detection by the inclination detecting means.

2. A vehicle comprising:
a front frame supporting a front wheel;
a rear frame supporting a rear wheel, the front frame being movably attached to the rear frame;
a centroid shifting means for shifting the centroid of a vehicle body by moving one of the front frame and the rear frame relative to the other; and
an inclination detecting means for detecting inclination of the vehicle body, and a control means for controlling the centroid shifting means based upon a result of detection by the inclination detecting mean,
wherein the control means controls the centroid shifting means to shift the centroid to an opposite side relative to an inclination direction of the vehicle body based upon the result of detection by the inclination detecting means when a vehicle speed is not larger than a preset speed.

3. The vehicle according to claim 2, wherein the control means controls the centroid shifting means to shift the centroid to the opposite side relative to the inclination direction of the vehicle body based upon the result of detection by the inclination detecting means when the vehicle body is standstill.

4. The vehicle according to claim 1, wherein the control means controls the centroid shifting means to shift the centroid to the same side as the inclination direction of the vehicle body based upon the result of detection by the inclination detecting means when the vehicle body turns.

5. The vehicle according to claim 1, wherein the centroid shifting means makes one of the front frame and the rear frame pivot relative to the other to shift the centroid of the vehicle body.

6. The vehicle according to claim 5, wherein the centroid shifting means includes a cylinder that makes one of the front frame and the rear frame pivot relative to the other.

7. The vehicle according to claim 5, further comprising a torsion spring positioned between the front frame and the rear frame and on the axis extending in the fore to aft direction of the vehicle body.

8. The vehicle according to claim 7, wherein no load is exerted on the torsion spring when a side surface of the front wheel and a side surface of the rear frame extend parallel to each other.

9. The vehicle according to claim 5, further comprising a regulating member for regulating a pivot angle of the front frame relative to the rear frame.

10. A vehicle comprising:
a front frame supporting a front wheel;
a rear frame supporting a rear wheel, the front frame being movably attached to the rear frame;
a centroid shifting means for shifting the centroid of a vehicle body by moving one of the front frame and the rear frame relative to the other; and wherein the front frame and the rear frame are capable to pivot relative to each other about an axis extending in a fore to aft direction of the vehicle body, and the centroid shifting means makes one of the front frame and the rear frame pivot relative to the other to shift the centroid of the vehicle body, wherein an extended line extended from the axis extending in the fore to aft direction of the vehicle body passes through the vicinity of a tangency at which the rear wheel contacts with the ground.

11. The vehicle according to claim 5, further comprising a bearing positioned between the front frame and the rear frame to support the front frame and the rear frame for pivotal movement relative to each other.

12. A vehicle comprising:

a front frame supporting a front wheel;

a rear frame supporting a rear wheel, the front frame being movably attached to the rear frame;

a centroid shifting means for shifting the centroid of a vehicle body by moving one of the front frame and the rear frame relative to the other;

wherein the front frame and the rear frame are capable to pivot relative to each other about an axis extending in a fore to aft direction of the vehicle body, and the centroid shifting means makes one of the front frame and the rear frame pivot relative to the other to shift the centroid of the vehicle body; and a bearing positioned between the front frame and the rear frame to support the front frame and the rear frame for pivotal movement relative to each other, wherein the front frame includes a head pipe, wherein the head pipe includes a convexed first bearing attaching portion formed to protrude rearward from the head pipe, having a pivot center on the axis extending in the fore to aft direction, and having an outer circumferential surface to which the bearing is attached, and wherein the rear frame includes a concaved second bearing attaching portion disposed to face the convexed first bearing attaching portion of the head pipe, and having an inner circumferential surface to which the bearing is attached.

* * * * *